United States Patent Office 3,023,210
Patented Feb. 27, 1962

3,023,210
PRODUCTION OF CARBOXY-SUBSTITUTED HETEROCYCLIC COMPOUNDS
Hartwig Schutt, Hagen, Westphalia, Germany, assignor to Henkel & Cie G.m.b.H., Dusseldorf-Holthausen, Germany, a corporation of Germany
No Drawing. Filed Sept. 11, 1958, Ser. No. 760,297
Claims priority, application Germany Apr. 30, 1956
16 Claims. (Cl. 260—250)

This invention relates to the production of carboxy-substituted heterocyclic compounds, and more particularly to the production of carboxy-substituted heterocyclic compounds having carbon atoms and two or more nitrogen atoms in the ring.

Carboxy-substituted heterocyclic compounds having carbon atoms and two or more nitrogen atoms in the ring are not new in the art, but they have heretofore always been produced by devious methods involving the oxidation of the correspondingly substituted alkyl derivatives which are difficult to produce. Moreover, the oxidation of such alkyl-substituted derivatives produces mediocre yields of the corresponding carboxy-substituted compounds.

It is an object of the present invention to provide a process for the production of carboxy-substituted heterocyclic compounds having carbon atoms and two or more nitrogen atoms in the ring which may be carried out in a very simple fashion with readily accessible starting materials and which will produce attractive yields of the desired compounds.

Other objects and advantages of the present invention will become apparent as the description proceeds.

I have found that carboxy-substituted heterocyclic compounds or their salts may be obtained with good yields by reacting heterocyclic compounds having an aromatic structure, which contain carbon atoms and at least two nitrogen atoms in the ring and also have at least one hydrogen atom attached to a ring carbon atom, either in the form of the free base or salts thereof, with carbon dioxide at elevated temperatures and in the presence of an alkaline-acting compound. Depending upon the reaction conditions and the structure of the heterocyclic compound serving as the starting material, the reaction forms salts of monobasic or polybasic carboxylic acids which may be transformed, if desired, into the corresponding free acids or their derivatives.

The reaction according to the present invention is illustrated below, using pyrazole as an example. If potassium carbonate is used as the alkaline-acting compound, the reaction proceeds at a temperature of 230° C. with the formation of the dipotassium salt of pyrazole-3,5-dicarboxylic acid, probably in accordance with the following general formula:

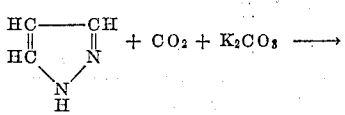

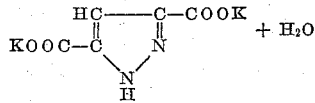

At more elevated temperatures, for example at 270° C., with all other conditions remaining the same, the potassium salt of pyrazole-4-monocarboxylic acid is formed:

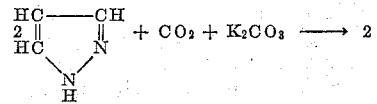

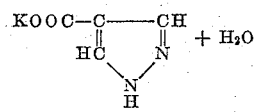

While the precise mechanics of the reaction are not fully understood, it is believed that the carboxyl groups first attach themselves to the ring at one or several of the ring carbon atoms having a hydrogen atom attached thereto, and that thereafter the alkaline-acting substance neutralizes at least one of the carboxyl groups to form a corresponding carboxylic acid salt. The water formed by the reaction is absorbed and bound by the excess of alkaline-acting substance which is preferably provided.

In some cases the salts of tricarboxylic acids are also formed as side products by the reaction according to this invention. The free tricarboxylic acids or their acid salts are, however, unstable under the prevailing conditions and readily split off carbon dioxide, so that their isolation is not always possible. In still other instances, for example in the case of triazole-1,2,4, the free dicarboxylic acid is not stable and decomposes into 1,2,4-triazole-monocarboxylic acid with accompanying splitting off of carbon dioxide.

Heterocyclic compounds with aromatic structure, containing carbon atoms and at least two nitrogen atoms in the ring, may be used as starting materials in the process according to this invention. These heterocyclic compounds are preferably those having from 5 to 6 atoms in the heterocyclic ring selected from the group consisting of carbon and nitrogen atoms, said heterocyclic ring containing at least two nitrogen atoms and at least one carbon atom having a hydrogen atom attached thereto and said heterocyclic ring being free of hydroxyl substituents. Such heterocyclic compounds are, for example, imidazole, pyrazole, 1,2,4-triazole, 1,2,3-triazole, tetrazole, pyrazine, pyrimidine, pyridazine, triazines and tetrazines. Similarly, the substitution products, for example the alkyl aromatic and amine substitution products of the above-named compounds, which are free of hydroxyl substituents, may be used as starting materials in the process according to this invention, provided they contain at least one hydrogen atom attached to a ring carbon atom, and further provided that they do not decompose under the reaction conditions. Such substitution products are, for example, 3-methyl-pyrazole, 3-phenyl-pyrazole, 3-methyl-5-phenyl-pyrazole, 2 - methyl - imidazole, 3 - methyl-triazole-1,2,4-methyl-pyrazine, 2,5-dimethyl-pyrazine, 2-phenyl-pyrimidine, 4-methyl-pyrimidine, benzo-pyrazine, 3-amino-1,2,4-trizole and the like. The condensed aromatic ring heterocyclic compounds of the above-named compounds, provided they contain at least one hydrogen atom attached to a heterocyclic ring carbon atom may likewise be used as starting materials. Such a condensed aromatic ring heterocyclic compound is, for example, indazole. Other suitable substitution products free of hydroxyl substituents also include the monocarboxylic acids of the above-named heterocyclic compounds or their salts or derivatives, provided they contain a replaceable hydrogen atom attached to a ring carbon atom, for example, imidazole-4-carboxylic acid, pyrazine-carboxylic acid, pyridazine-3-carboxylic acid, pyrimidine-4-carboxylic acid, pyrimidine-5-carboxylic acid, 1,2,4-triazole-monocarboxylic acid. The heterocyclic compounds may be used as starting materials in the form of their free bases or in the form of their salts with acids such as hydrochloric acid.

It is advantageous to employ the carbonates of alkali metals such as sodium, potassium and rubidium as the alkaline-acting compound. Especially good yields are obtained when potassium carbonate is used. Also the carbonates of magnesium, calcium or monovalent thallium, and others, are suitable for this purpose. In place of the carbonates of these elements, their oxides, hydroxides, bicarbonates, formates or oxalates may also be used. For optimum results, the starting materials should be as anhydrous as possible, although small amounts of water do not seriously interfere with the reaction. In order to utilize the often rather costly starting materials to the greatest extent, at least the theoretically necessary amount for formation of the mono- or dicarboxylic acid salts, but preferably an excess from 10 to 100% or more, of the particular alkaline-acting compound should be used.

The reaction according to the present invention takes place at elevated temperatures, in general above 150° C. the upper limit being merely the temperature at which the organic starting material decomposes. The optimum reaction temperature is different for the various individual starting materials, but in most cases it lies between 200 and 350° C. In some cases different products are formed from the same starting materials at different reaction temperatures.

The process herein disclosed is preferably carried out at elevated pressure by introducing into the reaction vessel at least the calculated amount of carbon dioxide, but preferably an excess thereof. The level of the elevated pressure may vary within wide limits during the reaction. The carbon dioxide may be diluted with inert gases, such as nitrogen. The reaction may, however, also be carried out at atmospheric pressure; for example, by passing a vapor of the heterocyclic compound serving as the starting material in admixture with carbon dioxide over the heated potassium carbonate, or by bringing carbon dioxide into contact with a heated mixture consisting of the heterocyclic compound and a suitable alkaline-acting compound.

I have further found that the reaction is favorably influenced by the presence of a great number of catalysts. Especially advantageous effects are produced by metallic zinc, cadmium, lead, mercury or iron, and compounds of these metals. These metals may be used, for example, in the form of their oxides or their inorganic or organic acid salts. The amount of catalyst added may vary within wide limits; for example, from 0 to 15%, preferably from 0.5 to 5%, by weight based on the weight of the reaction mixture. In most cases, the yields are satisfactory even without the addition of catalysts. In the presence of the above-named catalysts, however, the reaction product is often more pure, which is evidenced by the lighter color of the raw reaction product mixture.

In addition to the catalysts, inert fillers such as sand, finely divided carbon, kieselguhr, bentonite, metal powder, metal shavings, and inert salts such as sodium sulfate, potassium sulfate, calcium carbonate, and the like, may be added to the reaction mixture. The fillers are advantageously added in those cases where the reaction mixture tends to cake. Similarly, the addition of inert organic solvents or diluents, such as pyridine, dioxan, tetrahydrofuran, benzene, toluene, xylene, and high boiling-point gasolines, is sometimes advantageous to prevent caking and to facilitate agitation.

For purification of the reaction product mixture, it may, for example, be dissolved in water and then freed from undesirable components by filtration and in the presence of activated charcoal or other purification agents, if desired. The carboxylic acids or the carboxylic acid salts which are formed by the reaction may be precipitated from the aqueous solution by acidification of the solution to a suitable pH-value. The acidification may be carried out, for example, with hydrochloric acid, sulfuric acid or other acids. It is often advantageous to acidify the solution of the reaction mixture with carbon dioxide, because in that case the alkaline element may be recovered in the form of the carbonate or the bicarbonate, which may then be used again in the reaction. In some cases the relative insolubility of the potassium salts in a saturated potassium carbonate solution may be made use of in isolating the reaction products. In addition, the raw reaction product may be directly transformed into derivatives of the carboxylic acids, for example, their chlorides or esters, in accordance with known methods.

The utility of the carboxylic acids obtained in accordance with the novel process covers a variety of fields. The dicarboxylic acids may, for example, be used as reactants in all those cases where bifunctional compounds had heretofore been used, for example in the production of polyesters, synthetic resins or softeners. The dicarboxylic acids or their acid salts may further be used to produce monocarboxylic acids in a very simple fashion; for example, by decarboxylation which often takes place upon merely heating an aqueous solution thereof. In many cases the carboxylic acids obtained by the present process represent important intermediate products for organic synthesis. For instance, the imidazole-3,4-dicarboxylic acid may be used for the production of xanthine and histidine, and the 1,2,4-triazole-3-monocarboxylic acid may be used as the starting material for the synthesis of $\beta$-triazolylalanine in accordance with U. S. Patent No. 2,719,849.

The following examples will further illustrate the present invention and enable others skilled in the art to understand it more completely. It is, however, not intended to limit the invention to these particular illustrative examples.

Example I

A mixture of 10.0 gm. imidazole, 50.0 gm. potassium carbonate and 2.0 gm. cadmium fluoride was finely milled and homogenized in a ball mill, and subsequently heated in a 250 cc. rotary autoclave for 3 hours at 260° C. Prior to heating, the autoclave was flushed with carbon dioxide and carbon dioxide was introduced until the internal pressure reached 50 atmospheres. The faintly yellow raw reaction product had a weight of 71.0 gm. It was dissolved in 250 cc. water and the solution was filtered. Subsequently, the pH of the solution was adjusted to 2 with concentrated hydrochloric acid. After allowing the acid solution to stand for a short period of time, the monopotassium salt of imidazole-4,5-dicarboxylic acid precipitated out. The precipitation was completed by cooling the solution with ice. The yield was 31.5 gm. of an impure product. By recrystallization from boiling water, the salt was obtained in pure form and had a melting point of 288–291° C. (decomposition). Upon recrystallization from 0.5 N HCl (25 cc. per 1 gm. substance), the acid potassium salt was transformed into the free dicarboxylic acid, having a melting point of 288–290° C. (decomposition).

Example II

A mixture of 10.0 gm. imidazole and 50.0 gm. potassium carbonate was finely milled and homogenized in a ball mill, and thereafter heated under the same conditions as those in Example I in a 250 cc. rotary autoclave for 3 hours at 280° C. The raw reaction product was gray and weighed 70.7 gm. It was worked up in the same manner as described in Example I and yielded 23.0 gm., equivalent to 54.3% of theory, of the acid potassium salt of imidazole-4,5-dicarboxylic acid.

Example III 2.0 gm. freshly distilled pyrazole, 10.0 gm. potassium carbonate and 0.5 gm. anhydrous cadmium fluoride were intimately admixed in a mortar, and the mixture was placed into a test tube, which was then closed with glass wool. The test tube was then placed in a 250 cc. rotary autoclave lined with glass wool and heated for 2 hours at 230° C. in an atmosphere of carbon dioxide at an initial pressure of 50 atmospheres. The raw reaction product weighed 14.0 gm. It was dissolved in 25 cc. water and the solution was filtered and poured into 25 cc. cold 1 N HCl. After allowing the solution to stand for a short period of time, 1.8 gm. of pyrazole-3,5-dicarboxylic acid crystallized out of the solution, corresponding to 39.3% of theory. The melting point was 292° C.

Example IV 10.0 gm. imidazole, 50 gm. potassium carbonate and 6 gm. $K_2CdCl_2F_2$ were admixed and finely milled. 15.0 gm. of this mixture were placed into a test tube, which was then heated in an aluminum block for 4 hours at 240° C. During the heating step, gaseous carbon dioxide was passed over the mouth of the test tube. The yellow reaction product weighed 13.7 gm. It was dissolved in 50 cc. water, and the solution was filtered and the filtrate acidified with hydrochloric acid to a pH = 2. After cooling, 0.8 gm. of the acid potassium salt of imidazole-4,5-dicarboxylic acid crystallized out of the solution, which corresponds to a yield of 15.5% of theory.

Example V 5.0 gm. pyrazine were finely milled and admixed in a ball mill with 20.0 gm. potassium carbonate and 1.0 gm. cadmium carbonate. The mixture was heated in a rotary autoclave for 3 hours at 290° C. in an atmosphere of carbon dioxide at an initial pressure of 50 atmospheres. The reaction product was dissolved in 100 cc. water, the solution was filtered and pyrazine-2,5-dicarboxylic acid was precipitated from the filtrate by acidification to a pH=2.5 to 3.0. The precipitate was purified by dissolving it in dilute potassium hydroxide and pouring this solution into an excess of hydrochloric acid, and finally recrystallizing the precipitate from water in the presence of activated charcoal. The yield was 4.7 gm. of a pure recrystallized pyrazine-2,5-dicarboxylic acid, corresponding to a yield of 44.8% of theory.

Example VI (a) 5.0 gm. imidazole, 25.0 gm. anhydrous potassium carbonate and 100 gm. benzene, dried over sodium, were placed into an autoclave. The resulting suspension was heated for 2 hours at 250° C. in an atmosphere of carbon dioxide at an initial pressure of 50 atmospheres. Upon cooling, the solid substances were separated from the solvent by vacuum filtration, and thereafter dissolved in water and worked up in the manner described in Example I. The yield was 3.0 gm. of the acid potassium salt of imidazole-4,5-dicarboxylic acid, corresponding to a yield of 21.0% of theory.

(b) The run described under (a) was repeated but 100 gm. dioxan were used instead of the benzene. In this case the initial carbon dioxide pressure sank rapidly to about half the initial amount because of the solubility of the gas in dioxan. Upon purification of the reaction product, 4.6 gm. of the acid potassium salt of imidazole-4,5-dicarboxylic acid were obtained, which corresponds to a yield of 32.3% of theory.

Example VII (a) An intimate mixture composed of 10.0 gm. 1,2,4-triazole and 50.0 gm. anhydrous potassium carbonate was heated in a rotary autoclave for 3 hours at 220° C. in an atmosphere of carbon dioxide at an initial pressure of 50 atmospheres. The white fused reaction product was dissolved in 300 cc. water and the solution was filtered. Subsequently, the filtrate was slowly acidified while hot with concentrated hydrochloric acid. At pH=7 to 8, small amounts of the acid potassium salt of 1,2,4-triazole-3,5-dicarboxylic acid separated out, which were filtered off. Upon further acidification of the filtrate to a pH=1, 12.8 gm. of free 1,2,4-triazole-monocarboxylic acid crystallized out, which corresponds to a yield of 78.0% of theory. The product was analytically pure and had a melting point of 132° C.

(b) The same starting materials as in (a) were heated for 3 hours at 270° C. under otherwise identical conditions. The reaction product was worked up in the same manner as described in the previous example. At pH=7.5, 2.0 gm. of the acid potassium salt of 1,2,4-triazole-3,5-dicarboxylic acid crystallized out, and when a pH=1 was reached, 11.2 gm. of 1,2,4-triazole-monocarboxylic acid separated out in the form of needles.

Example VIII

A mixture of 2.1 gm. 1,2,4-triazole and 20.0 gm. anhydrous sodium carbonate was finely milled and heated for 3 hours at 230° C. in an atmosphere of carbon dioxide at an initial pressure of 50 atmospheres. The reaction product was worked up in the manner described in Example VII(a) and (b). 1.5 gm. 1,2,4-triazole-monocarboxylic acid were obtained, which corresponds to a yield of 43.7% of theory.

Example IX 100.0 gm. 1,2,4-triazole and 500 gm. anhydrous potassium carbonate were milled and intimately admixed with each other, and the mixture was heated for 3 hours at 270° C. in an autoclave in an atmosphere of carbon dioxide at an initial pressure of 50 atmospheres. The raw reaction product was dissolved in 1200 cc. cold water, the solution was filtered and the filtrate was thereafter adjusted to a pH=6 with hydrochloric acid. 19.4 gm. of the dipotassium salt of 1,2,4-triazole-3,5-dicarboxylic acid separated out, which were filtered off by vacuum filtration. By further acidifying the solution while cold to a pH=1, 170.1 gm. of the acid potassium salt of 1,2,4-triazole-3,5-dicarboxylic acid were obtained, which corresponds to a yield of 60% of theory.

Example X 8.2 gm. pyrazole, 41.0 gm. potassium carbonate and 1.5 gm. cadmium fluoride were intimately admixed and heated for 2 hours at 270° C. with an initial carbon dioxide pressure of 50 atmospheres. The snow-white powdery reaction product weighed 55.7 gm. It was dissolved in 250 cc. water and the solution was filtered. The filtrate was acidified with hydrochloric acid to a pH=1 and then cooled with ice, whereby 8.1 gm. of pyrazole-4-monocarboxylic acid crystallized out, which corresponds to a yield of 60.0% of theory. The product was extremely pure.

Example XI 10.0 gm. 2-methyl-imidazole, 50.0 gm. anhydrous potassium carbonate and 2.0 gm. cadmium fluoride were milled and intimately admixed with each other, and the mixture was heated in a rotary autoclave for 3 hours at 260° C. in an atmosphere of carbon dioxide at an initial pressure of 50 atmospheres. The white reaction product weighed 65.3 gm. It was dissolved in 200 cc. cold water. The solution was filtered and the filtrate was acidified with hydrochloric acid to a pH=2. After a short period of standing in the cold, 9.0 gm. of the acid potassium salt of 2-methyl-imidazole-4,5-dicarboxylic acid crystallized out of the solution, which corresponds to a yield of 36% of theory.

Example XII 13.9 gm. 2-propyl-imidazole and 50.0 gm. anhydrous potassium carbonate were milled and intimately admixed with each other, and thereafter heated for 3 hours at 260° C. in an atmosphere of carbon dioxide at an initial pressure of 50 atmospheres. The light-yellow powdery reaction product weighed 68.7 gm. It was dissolved in 200 cc. water. The solution was filtered and the filtrate acidified with hydrochloric acid to a pH=2. After a short period of standing, 11.2 gm. of the acid potassium salt of 2-propyl-imidazole-4,5-dicarboxylic acid crystallized out of the solution, which corresponds to a yield of 38% of theory.

*Example XIII*

9.3 gm. of indazole and 50.0 gm. of anhydrous potassium carbonate were ground together and heated at 260° C. for three hours in a rotating autoclave at an initial carbon dioxide pressure of 50 atm. The white reaction product, which weighed 67.3 gm., was dissolved in 300 cc. of water. The solution was filtered and the filtrate acidified to pH 2 with concentrated hydrochloric acid. The precipitated indazole-3-carboxylic acid was filtered off by suction and recrystallized from aqueous methanol. The yield amounted to 5.7 gm., melting point 260° C.

*Example XIV*

10.0 gm. of 3-amino-1,2,4-triazole, 50.0 gm. of anhydrous potassium carbonate and 2.0 gm. of cadmium fluoride were ground together and heated at 260° C. for five hours in a rotating autoclave at an initial carbon dioxide pressure of 50 atm. The colourless reaction product, weighing 67.3 gm. was dissolved in 300 cc. of warm water. The solution was filtered and the filtrate acidified to pH 2 with hydrochloric acid. The precipitate which formed, after standing a little was filtered by suction. 7.6 gm. of 3-amino-1,2,4-triazole-5-carboxylic acid were obtained which had a melting point of 178° C.

*Example XV*

10.0 gm. of imidazole hydrochloride were ground with 50.0 gm. of anhydrous potassium carbonate and 2.0 gm. of cadmium fluoride in a ball mill and heated at 260° C. for five hours in a rotating autoclave at an initial carbon dioxide pressure of 50 atm. The reaction product was dissolved in 400 cc. of water. The solution was filtered and the filtrate acidified to pH 2 with concentrated hydrochloric acid. 11.3 gm. of the acid potassium salt of the imidazole-4,5-dicarboxylic acid crystallized out, corresponding to a yield of 76% of the theoretical.

*Example XVI*

10.0 gm. of 1,2,4-triazole-monohydrochloride were ground with 50.0 gm. of anhydrous potassium carbonate and 2.0 gm. of cadmium fluoride in a ball mill and heated at 260° C. for five hours in a rotating autoclave at an initial carbon dioxide pressure of 50 atm. The reaction product was dissolved in 400 cc. of water. The solution was filtered and the filtrate acidified to pH 2 with concentrated hydrochloric acid. 9.7 gm. of the acid potassium salt of the 1,2,4-triazole-3,5-dicarboxylic acid crystallized out.

*Example XVII*

A mixture of 10.0 gm. imidazole, 2.0 gm. cadmium fluoride and 11.3 gm. pulverised, anhydrous caustic potash was heated in a rotating autoclave of 200 cc. capacity under a carbon dioxide pressure of 79 atm. (at 260° C.) to 260° C. for three hours. After cooling and releasing the pressure, the crude reaction product was dissolved in 300 cc. of water and insoluble portions were filtered off. The clear filtrate was adjusted to pH-3 with concentrated hydrochloric acid. After standing for a comparatively long time in the refrigerator, 2.5 gm. of the acid potassium salt of imidazole 4,5-dicarboxylic acid crystallized out.

*Example XVIII*

3.0 gm. of 1,2,4-triazole and 10.0 gm. anhydrous rubidium carbonate were thoroughly mixed by grinding and heated at 220° C. for 3 hours in a rotating autoclave of 200 cc. capacity. Before beginning the heating $CO_2$ was introduced until a pressure of 50 atmospheres was established. The crude reaction product was dissolved in 100 cc. water and adjusted to a pH of 2 with hydrochloric acid. After standing for a while in the refrigerator, 8.1 gm. (78% of the theoretical) of the acid rubidium salt of 1,2,4-triazole-3,5-dicarboxylic acid crystallized out.

*Example XIX*

A mixture of 1.4 gm. of tetrazole and 3.0 gm. of anhydrous potassium carbonate was finely ground in a mortar. The mixture was placed in a small test tube, the neck of which had been drawn out to capillary size. The small tube prepared in this way was heated in an autoclave for one hour at 180° C., under a pressure of 77 atmospheres $CO_2$. The crude reaction product was dissolved in 5 cc. of water and filtered and by the addition of ethanol the potassium salt of the tetrazole carboxylic acid was precipitated in the form of needles. The yield amounted to 1.5 gm. (50% of the theoretical).

*Example XX*

10.0 gm. of the monopotassium salt of triazole-1,2,4-monocarboxylic acid-3 were intimately admixed with 50.0 gm. anhydrous potassium carbonate, and the resulting mixture was heated for 3 hours at 260° C. in an atmosphere of carbon dioxide at an initial pressure of 50 atmospheres. The reaction product was dissolved in water. The resulting solution was filtered and the filtrate was adjusted to a pH of 2 with hydrochloric acid. The crystals precipitated thereby were filtered off and dried. 9.4 gm. of the acid potassium salt of triazole-1,2,4-dicarboxylic acid-3,5 (acid number 302; melting point 300° C.) were obtained. By extraction with ether, an additional 0.8 gm. of the free triazole-1,2,4-dicarboxylic acid-3,5 were obtained from the filtrate.

The examples disclose the various embodiments of my invention. Examples 1–10 and 15–19 disclose carboxylation of unsubstituted heterocyclic compounds containing 5 or 6 atoms in the ring and from two to four nitrogen atoms. Examples 11 and 12 disclose carboxylation of alkyl substituted heterocyclic compounds; Example 13, carboxylation of a condensed aromatic ring substituted heterocyclic compound; Example 14, carboxylation of an amino-substituted heterocyclic compound and Example 20 discloses carboxylation of a mono-carboxylic substituted heterocyclic compound. Examples 1, 3–5, 10, 11, and 14 to 17 disclose use of catalysts of various types, the remainder of the examples are non-catalytic. Example 4 was performed at atmospheric pressure. Example 6 discloses the use of solvents. Example 7 demonstrates the effect of temperature, as likewise does Examples 3 and 10. Examples 14 and 15 disclose the use of acid salts of the heterocyclic compounds as starting materials. Examples 8, 17, and 18 disclose the use of sodium carbonate, potassium hydroxide and rubidium carbonate as the alkaline compound.

While I have illustrated the present invention with the aid of certain specific embodiments thereof, it will be apparent to persons skilled in the art that my invention is not limited to these embodiments and that various changes and modifications may be made therein without departing from the spirit of the invention or the scope of the appended claims.

This application is a continuation-in-part of U.S. patent application Serial No. 637,900, filed February 4, 1957, in my name, now abandoned.

I claim:
1. The process of producing alkali metal salts of carboxy-substituted heterocyclic compounds by direct introduction of a carboxyl group on a carbon atom of the heterocyclic ring, which comprises reacting a heterocyclic compound selected from the group consisting of indazole, imidazole, pyrazole, 1,2,4-triazole, 1,2,3-triazole tetrazole, pyrazine pyrimidine pyridazine, triazines and tetrazines and their corresponding lower alkyl, phenyl, amino and monocarboxyl substituted analogues, said heterocyclic ring containing at least one carbon atom having a hydrogen atom attached thereto, with carbon dioxide under substantially anhydrous conditions in the presence of an alkaline compound selected from the group consisting of oxides, hydroxides, carbonates, bicarbonates, oxalates and formates of alkali metals, at a temperature between about 150° C. and the decomposition temperature of said heterocyclic starting compound, whereby at least one carboxyl group is added to at least one carbon atom having a hydrogen atom attached thereto in said heterocyclic ring.

2. The process of producing carboxy-substituted heterocyclic compounds having a stable free carboxyl group attached to a carbon atom of the heterocyclic ring which comprises reacting a heterocyclic compound selected from the group consisting of indazole, imidazole, pyrazole, 1,2,4-triazole, 1,2,3-triazole, tetrazole, pyrazine, pyrimidine, pyridazine, triazines and tetrazines and their corresponding lower alkyl, phenyl, amino and monocarboxyl substituted analogues, said heterocyclic ring containing at least one carbon atom having a hydrogen atom attached thereto, with carbon dioxide under substantially anhydrous conditions in the presence of an alkaline compound selected from the group consisting of oxides, hydroxides, carbonates, bicarbonates, oxalates and formates of alkali metals at a temperature between about 150° C. and the decomposition temperature of said heterocyclic starting compound, whereby at least one carboxyl group is added to at least one carbon atom having a hydrogen atom attached thereto in said heterocyclic ring, dissolving the salt of the carboxy-substituted heterocyclic compound formed thereby in water, precipitating the corresponding stable heterocyclic carboxylic acid compound by acidifying the aqueous solution, and separating the precipitate from the acidified solution.

3. The process of producing alkali metal salts of carboxy-substituted aromatic heterocyclic compounds by direct introduction of a carboxyl group on a carbon atom of the heterocyclic ring, which comprises reacting a heterocyclic compound selected from the group consisting of indazole, imidazole, pyrazole, 1,2,4-triazole, 1,2,3-triazole, tetrazole, pyrazine, pyrimidine, pyridazine, triazines and tetrazines and corresponding lower alkyl, phenyl, amino and monocarboxyl substituted analogues, said heterocyclic ring containing at least one carbon atom having a hydrogen atom attached thereto, with carbon dioxide under substantially anhydrous conditions in the presence of an alkaline compound selected from the group consisting of oxides, hydroxides, carbonates, bicarbonates, oxalates and formates of alkali metals, and a catalyst selected from the group consisting of zinc, cadmium, mercury, lead and iron and their oxides, inorganic acid salts and organic acid salts at a temperature between about 150° C. and the decomposition temperature of said heterocyclic starting compound, whereby at least one carboxyl group is added to at least one carbon atom having a hydrogen atom attached thereto in said heterocyclic ring.

4. The process of producing carboxy-substituted heterocyclic compounds having a stable free carboxyl group attached to a carbon atom of the heterocyclic ring, which comprises reacting a heterocyclic compound selected from the group consisting of indazole, imidazole, pyrazole, 1,2,4-triazole, 1,2,3-triazole, tetrazole, pyrazine, pyrimidine, pyidazine, triazines and tetrazines and their corresponding lower alkyl, phenyl, amino and monocarboxyl substituted analogues, said heterocyclic ring containing at least one carbon atom having a hydrogen atom attached thereto, with carbon dioxide under substantially anhydrous conditions in the presence of an alkali metal compound selected from the group consisting of oxides, hydroxides, carbonates, bicarbonates, oxalates and formates of alkali metals, and a catalyst selected from the group consisting of zinc, cadmium, lead, mercury and iron and their oxides, inorganic acid salts and organic acid salts at a temperature between about 150° C. and the decomposition temperature of said heterocyclic starting compound, whereby at least one carboxyl group is added to at least one carbon atom having a hydrogen atom attached thereto in said heterocyclic ring, dissolving the salt of the carboxy-substituted heterocyclic compound formed thereby in water, precipitating the corresponding stable heterocyclic carboxylic acid compound by acidifying the aqueous solution, and separating the precipitate from the acidified solution.

5. The process according to claim 1, wherein the alkaline compound is potassium carbonate.

6. The process according to claim 2, wherein the alkaline compound is potassium carbonate.

7. The process according to claim 3, wherein the catalyst is cadmium fluoride.

8. The process according to claim 3, wherein the catalyst is cadmium chloride.

9. The process according to claim 4, wherein the catalyst is cadmium fluoride.

10. The process according to claim 4, wherein the catalyst is cadmium chloride.

11. The process according to claim 1, wherein the reaction is carried out in the presence of an inert organic solvent.

12. The process according to claim 2, wherein the reaction is carried out in the presence of an inert organic solvent.

13. The proces according to claim 1, wherein the acid salts of said heterocyclic compounds are used as starting materials.

14. The process according to claim 1, wherein alkyl substituted heterocyclic compounds are used as starting materials.

15. The process according to claim 1, wherein amino substituted heterocyclic compounds are used as starting materials.

16. The process according to claim 1, wherein monocarboxyl substituted heterocyclic compounds are used as starting materials.

References Cited in the file of this patent

UNITED STATES PATENTS

| | | |
|---|---|---|
| 2,891,992 | Raecke et al. | June 23, 1959 |
| 2,900,386 | Raecke et al. | Aug. 18, 1959 |

FOREIGN PATENTS

| | | |
|---|---|---|
| 241,899 | Germany | 1910 |
| | Frdl. 10, 260 | |

OTHER REFERENCES

Ciamician et al.: Berichte volumes, dates and pages: 14; 1881; 1053–6–17; 1884; 1437–9.

Ciamician et al.: Gazz. Chim. Ital., vol. 12 (1882), page 272.

Ciamician et al.: Gazz. Chim. Ital., vol. 14, 1884, page 266.

Morton: Chemistry of Heterocyclic Compounds (McGraw-Hill, 1946), pages 60–1.

Lindsey et al.: Chemical Reviews, vol. 57 (1957), pages 583–614, page 611 relied on.